United States Patent

Hake

(10) Patent No.: US 7,319,679 B2
(45) Date of Patent: Jan. 15, 2008

(54) METHOD FOR REDUCING THE LATENCY DURING THE TRANSMISSION OF INFORMATION IN A GPRS NETWORK

(75) Inventor: Jens Hake, Burkhardtsdorf OT Kemtau (DE)

(73) Assignee: T-Mobile Deutschland GmbH, Bonn (DE)

( * ) Notice: Subject to any disclaimer, the term of this patent is extended or adjusted under 35 U.S.C. 154(b) by 727 days.

(21) Appl. No.: 10/476,310

(22) PCT Filed: May 29, 2002

(86) PCT No.: PCT/DE02/01978

§ 371 (c)(1),
(2), (4) Date: Mar. 22, 2004

(87) PCT Pub. No.: WO02/098068

PCT Pub. Date: Dec. 5, 2002

(65) Prior Publication Data

US 2004/0146069 A1  Jul. 29, 2004

(30) Foreign Application Priority Data

May 31, 2001 (DE) .............................. 101 26 709

(51) Int. Cl.
*H04Q 7/00* (2006.01)

(52) U.S. Cl. ..................................................... 370/329
(58) Field of Classification Search ................ 370/238, 370/328–330, 343, 345, 498
See application file for complete search history.

(56) References Cited

U.S. PATENT DOCUMENTS

2004/0047292 A1 * 3/2004 du Crest et al. ............ 370/235

* cited by examiner

*Primary Examiner*—Kwang Bin Yao
*Assistant Examiner*—Tung Tran
(74) *Attorney, Agent, or Firm*—Cooper & Dunham LLP

(57) ABSTRACT

The invention relates to a method for reducing the latency in a GPRS network, via which information is transmitted between a data requesting unit, i.e. a client (1), and a data-providing unit, i.e. a server (9), in the form of data packets. In order to transmit the data packets from the client (1) to the server (9), at least one first communication channel (UL-TBF) is opened and then closed. At least a second communication channel (DL-TBF) is then opened and closed for transmitting information from the server (9) to the client (1). A not insignificant latency is thus produced between the request for information and the receipt of information, which can be reduced, according to the invention, by opening the second communication channel (DL TBF) before closing the first communication channel (UL-TBF). A radio channel is thus provided for preventive purposes, for the feedback of the requested data.

4 Claims, 1 Drawing Sheet

Figure 1:
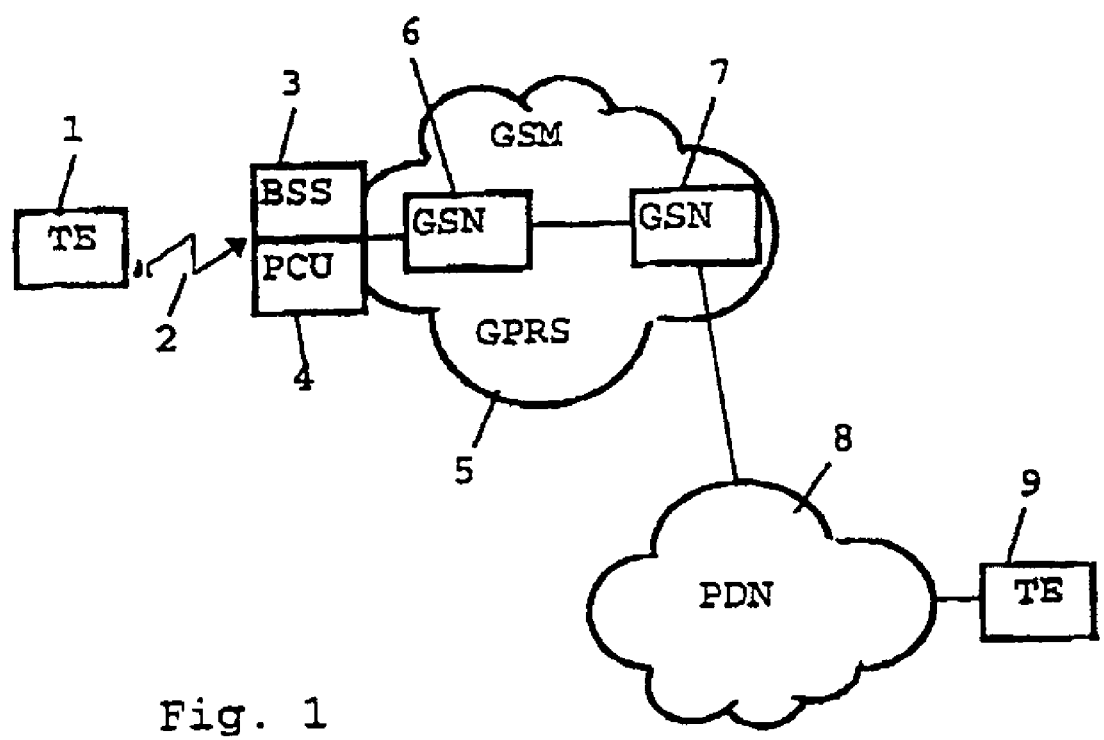

METHOD FOR REDUCING THE LATENCY DURING THE TRANSMISSION OF INFORMATION IN A GPRS NETWORK

The general packet radio service, GPRS for short, is a new standard in wireless data transmission which is based on the previous GSM mobile radio standard. A detailed description of the GPRS standard can be found in: GSM Technical Specification 03.60; Digital Cellular Telecommunications System (Phase 2+), General Packet Radio Service; Service Description, Stage 2; published by the European Telecommunications Standards Institute (ETSI) on Feb. 27, 1997.

Like the TCP/IP protocol, the GPRS is based on the switching of individual data packets and does not transmit on a continuous data stream. These data packets can be transmitted to the receiver separately form one another and can be compiled again by the receiver. This allows better use to be made of the available bandwidths.

The GPRS allows data to be transmitted between a transmitter and one or more receivers. In this case, transmitter and receiver can be mobile appliances or simple data terminal equipment. Data terminal equipment is systems such as mobile telephones, personal computers or else barcode scanners which is connected to the network by means of cable. In the GPRS, all subscribers share the transmission capacity available in a GSM radio cell; the radio interface is engaged only when data packets are actually being transmitted. That is to say, the radio link is set up and cleared down again for each data transmission, both for transmission in the uplink i.e. from a transmitter via the mobile radio network to a receiver, and in the downlink, i.e. from the receiver via the mobile radio network back to the transmitter. The data transmission in this context is unidirectional.

The data packets in the network are controlled by means of "GPRS support nodes" (GSN) and "packet control units" (PCU) which have been set up in network elements in the GSM mobile radio network. These GSNs are also responsible for roaming and for the gateway function for other communication networks.

Dynamic resource distribution in the GSM GPRS radio network ensures the frictionless coexistence of circuit-switched channels (GSM) and packet-switched channels (GPRS) in the same communication network.

In the GPRS network at present, the high latency for data transmissions is a central problem and significantly reduces the performance of internet applications. A simple data transaction can take 2-3 s in the GPRS network. The same transaction using a circuit-switched data service is much faster and is in the range of 500-700 ms.

The high latency for data transmissions via the GPRS network causes considerable performance restrictions for internet applications such as WAP or Internet browsers, since these applications are in principle always based on a subscriber unit (client) demanding information from a data-providing device (server) by transmitting a request via the GPRS network. The data are transmitted back with the aforementioned latency of 2-3 s.

The object of the invention is to reduce the latency during the transmission of information in a GPRS network, and in particular to shorten the delivery time for the data which a client demands from a server.

The invention is based on the consideration that there is a very high likelihood of the transmission of data packets from a client to a server via the GPRS network needing to be followed at a very short interval by the transmission of data from the server to the client.

To lower the latency for data transactions significantly, the invention proposes that the base station system (BSS) in the GSM mobile radio network incorporate a function which actually opens the communication channel for transmitting information back from the server to the client before the communication channel is closed for the purpose of transmitting information from the client to the server. Accordingly, this method relates, in particular, to the part of the data channel which is formed by the air interface between a mobile radio subscriber unit, e.g. a mobile telephone, and a base station in the GSM mobile radio network.

Expressed another way, during the runtime on an "uplink data channel" (UL-TBF), which allows data to be transmitted to a server by the client via the GPRS network, the base station is already taking the preventive measure of opening up a "downlink data channel" (DL-TBF), which allows data to be received from the server by the client via the GPRS network.

This downlink data channel opened up as a preventive measure preferably remains actively open only for a particular time, e.g. 300-2000 ms, after the uplink data channel is closed, so as firstly to be able to deliver the data arriving to the client form the server as quickly as possible and secondly to conserve the radio resources if, contrary to expectation, no transmission of data takes place between the server and the client. Preferably, the period of time is 500-1000 ms, however.

Such an additional function allows significant improvements to be made in the area of the latency when minimal resources are used on the air interface. For the subscribers, a marked performance increase will become noticeable.

To carry out the method, technical alterations are required for the packet control units (PCUs) which have been set up in the base station systems (BSS), preferably in the base station control devices (BSC), in the mobile radio network. The PCU influences the BSC, which provides the necessary radio resources, that is to say radio channels, at coordinated times.

Use of the method inevitably results in relatively high consumption of radio channel resources, since radio channels for transmitting back data are already being reserved as a preventive measure. To keep down this resource consumption as much as possible, provision is made for the downlink radio channel not to be opened until the last data packet has been transmitted via the uplink radio channel.

When the last data packet has been transmitted, the uplink radio channel is kept open for a particular period of time in line with the GPRS specification. This period of time is controlled by a timer and is referred to as the countdown procedure.

The invention can make use of this by virtue of the downlink radio channel not being opened until the countdown procedure is approaching its end.

An exemplary embodiment of the invention is explained in more detail with reference to FIG. 1 of the drawing.

FIG. 1 shows a subscriber unit 1 which can be in the form of a mobile telephone, for example. The subscriber unit 1 is a client and wishes to retrieve information form another subscriber unit 9, which is a server, via a GPRS network 5.

The GPRS network 5 is part of a GSM mobile radio network. The subscriber unit 1 uses the air interface 2, as part of a communication channel, to connect to the base station system 3 in the mobile radio network 5 and transmits the request for information by means of data packets to the base station system, and from there to a packet control unit 4. The PCU 4 receives the data packets and forwards them to a GPRS support node GSN 6. One or more further GSN 7 is/are used to set up a connection to the relevant data network PDN 8, e.g. the Internet, to which the server 9 is connected. The requested data are provided by the server 9 and are transmitted to the client 1 in the opposite direction in the form of data packets using another communication channel.

For the purpose of requesting the data, a communication channel is opened temporarily between the client 1 and the base station system 3 and ultimately the server 9 via the air interface 2 and is closed again when the request has been transmitted. In line with the invention, a communication channel which will probably be needed is now opened as a preventive measure, for the purpose of transmitting information back from the server 9 to the client 1, before the first communication channel is closed.

The invention claimed is:

1. A method for reducing the latency in a GPRS network which is used to transmit information in the form of data packets between a data-requesting unit, client, and a data-providing unit, server, with transmission of the data packets from the client to the server involving at least one first communication channel being opened and closed again, and subsequently transmission of information from the server to the client involving at least one second communication channel being opened and closed again, characterized in that the second communication channel is not opened until a last data packet has been transmitted via the first communication channel and a countdown procedure performed in the first communication channel is approaching its end.

2. The method as claimed in claim 1, characterized in that the data packets are transmitted using radio channels in the GSM mobile radio network which are part of the communication channels.

3. The method as claimed in claim 1, characterized in that the second communication channel remains open only for a predetermined time after the first communication channel is closed.

4. The method as claimed in claim 3, characterized in that the predetermined time is between 300 and 2000 ms.

* * * * *